(12) United States Patent
Burt et al.

(10) Patent No.: US 7,956,606 B2
(45) Date of Patent: Jun. 7, 2011

(54) POSITION SENSING ASSEMBLY

(75) Inventors: Raymond Lee Burt, Camarillo, CA (US); Russell Robert Bessinger, Palmdale, CA (US)

(73) Assignee: Woodward HRT, Inc., Santa Clara, CA (US)

( * ) Notice: Subject to any disclaimer, the term of this patent is extended or adjusted under 35 U.S.C. 154(b) by 489 days.

(21) Appl. No.: 12/145,136

(22) Filed: Jun. 24, 2008

(65) Prior Publication Data

US 2009/0317027 A1 Dec. 24, 2009

(51) Int. Cl.
*G01B 7/30* (2006.01)
*G01B 7/14* (2006.01)
*F42B 10/00* (2006.01)
*B64C 13/04* (2006.01)

(52) U.S. Cl. ......... 324/207.25; 324/207.24; 324/207.22; 324/207.13; 324/207.18; 324/207.15; 324/207.16; 324/207.2; 324/207.21; 244/3.1; 244/3.2; 244/3.3; 244/3.15; 244/3.21; 244/220; 244/221; 244/3.24

(58) Field of Classification Search ............. 324/207.24, 324/207.22, 207.13, 207.18, 207.15, 207.16, 324/207.2, 207.21; 244/3.1–3.3, 3.15, 3.21, 244/3.24, 220, 221

See application file for complete search history.

(56) References Cited

U.S. PATENT DOCUMENTS

| 5,313,852 | A | 5/1994 | Arena | |
|---|---|---|---|---|
| 5,491,633 | A * | 2/1996 | Henry et al. | ..................... 701/36 |
| 6,520,006 | B2 | 2/2003 | Burns | |
| 6,854,335 | B1 | 2/2005 | Burns | |
| 6,911,819 | B1 * | 6/2005 | Tabrizi | ..................... 324/207.18 |
| 6,981,421 | B2 | 1/2006 | Palmer et al. | |
| 7,116,100 | B1 | 10/2006 | Mock et al. | |
| 7,215,113 | B2 | 5/2007 | Kinoshita | |
| 7,218,099 | B2 * | 5/2007 | Yamamoto et al. | ....... 324/207.25 |
| 2006/0022667 | A1 * | 2/2006 | Nyce | ........................ 324/207.24 |
| 2007/0145969 | A1 * | 6/2007 | Rosplock | .................... 324/207.2 |
| 2007/0216401 | A1 * | 9/2007 | Baak et al. | ................. 324/207.24 |
| 2008/0001037 | A1 * | 1/2008 | Cox et al. | ....................... 244/221 |

FOREIGN PATENT DOCUMENTS

| EP | 1598526 A2 | 11/2005 |
|---|---|---|
| EP | 1785346 A2 | 5/2007 |
| EP | 1793477 A1 | 6/2007 |
| EP | 1832851 A2 | 9/2007 |
| GB | 2272205 A | 11/1994 |
| GB | 2403015 A | 12/2004 |
| WO | 2008/010066 A2 | 1/2008 |

OTHER PUBLICATIONS

International Search Report and Written Opinion for PCT/US2009/048303, mailed Jan. 22, 2010.

* cited by examiner

*Primary Examiner* — Ha Tran T Nguyen
*Assistant Examiner* — Lamarr Brown
(74) *Attorney, Agent, or Firm* — BainwoodHuang

(57) ABSTRACT

A position sensing assembly includes a bearing element and a helically shaped rotational member used to drive a portion of a sensor assembly, such as a Digital Rotary Magnetic Encoder. Interaction between the bearing element and a helically shaped rotational member minimizes the presence of backlash in the position sensing assembly. Accordingly, as an actuator assembly drives both a control element, such as a flight control surface, and the position sensing assembly, the sensor assembly generates an output signal that accurately reflects the position of the control element.

20 Claims, 10 Drawing Sheets

POSITION SENSING ASSEMBLY

BACKGROUND

Certain mechanical systems include one or more actuators to provide a desired linear or rotary motion to a moveable element. Such actuators include a motor and output drive train and typically include position sensors to measure the position of the moveable elements in the mechanical system.

For example, conventional aircraft utilize one or more actuators to adjust and maintain the position of aircraft flight control surfaces such as ailerons, elevators, and rudders. In order to track the relative position of the aircraft flight control surfaces, the actuators include one or more linear position sensors, such as a linear variable differential transformer (LVDT). Conventional LVDTs include a primary coil of wire and two secondary coils of wire that surround a ferromagnetic core. During operation, as the actuator adjusts the position of a corresponding flight control surface, the actuator also adjusts the position of the ferromagnetic core relative to the coils of wire. As the ferromagnetic core translates past the primary and secondary coils, the ferromagnetic core causes the voltages induced in the secondary coils to change. The change in the induced voltage corresponds to the change in linear position of the ferromagnetic core and the change in position of corresponding flight control surface. Accordingly, as the LVDT provides an output signal, corresponding to the induced change in voltage, to an actuator controller, the actuator controller can detect the exact position of the flight control surface.

SUMMARY

Conventional actuators, such as those used to control the operation of flight control surfaces in aircraft, suffer from a variety of deficiencies. Actuators for aircraft flight control surfaces typically include LVDTs to provide tracking of the position of the flight control surfaces during operation. However, LVDTs used as part of conventional actuators are relatively expensive to install and maintain. Additionally, the signals generated by the LVDTs require signal conditioning and processing, such as signal amplification, prior to delivery to an actuator controller. The requirement of additional signal processing equipment for use with the actuators adds to the overall costs associated with the actuators.

Embodiments of the present invention overcome the aforementioned deficiencies and relate to a position sensing assembly, such as utilized as part of an actuator assembly. The position sensing assembly includes a bearing element and a helically shaped rotational member used to drive a portion of a sensor assembly, such as a Digital Rotary Magnetic Encoder. Interaction between the bearing element and a helically shaped rotational member minimizes the presence of backlash in the position sensing assembly. Accordingly, as an actuator assembly drives both a control element, such as a flight control surface, and the position sensing assembly, the sensor assembly generates an output signal that accurately reflects the position of the control element. Additionally, when used as part of an actuator assembly for positioning aircraft flight control surfaces, the position sensing assembly provides a relatively low cost alternative to conventional position sensors, such as LVDTs. For example, the Digital Rotary Magnetic Encoder used with the position sensing assembly does not require signal conditioning and signal processing equipment as does an LVDT. Accordingly, installation and operation of the position sensing assembly is relatively less expensive compared to conventional position sensors.

In one arrangement, a position sensing assembly includes a rotational member defining a helix extending between a first end of the rotational member and a second end of the rotational member, the first end opposing the second end. The rotational member includes a first portion carried by a bearing element disposed at the second end of the positioning element and a second portion configured to be rotatably coupled to a housing. The position sensing assembly includes a sensor assembly having a magnet portion disposed at the second end of the rotational member and a sensor portion disposed in electromagnetic communication with the magnet portion. The bearing element is configured to rotate the rotational member and the magnet portion relative to the sensor portion.

In one arrangement, an actuator assembly includes a positioning element carried by a housing, the positioning element having a first end and a second end opposing the first end, the first end of the positioning element being constructed and arranged to be coupled to a control element. The actuator assembly includes a rotational member defining a helix extending between a first end of the rotational member and a second end of the rotational member, the first end opposing the second end. The rotational member includes a first portion carried by a bearing element disposed at the second end of the positioning element and a second portion rotatably coupled to the housing. The sensor assembly includes a magnet portion disposed at the second end of the rotational member and a sensor portion carried by the housing, the sensor portion disposed in electro-magnetic communication with the magnet portion. The bearing element is configured to rotate the rotational member and the magnet portion relative to the sensor portion when the positioning element linearly translates between a first position and a second position.

In one arrangement, a flight control assembly includes a flight control surface and an actuator assembly. The actuator assembly includes a housing, a positioning element carried by the housing, the positioning element having a first end and a second end opposing the first end, the first end of the positioning element coupled to the flight control surface, a bearing element disposed at the second end of the positioning element, and a rotational member defining a helix extending between a first end of the rotational member and a second end of the rotational member, the first end opposing the second end. The rotational member includes a first portion carried by the bearing element and a second portion rotatably coupled to the housing. The actuator assembly includes a sensor assembly having a magnet portion disposed at the second end of the rotational member and a sensor portion carried by the housing, the sensor portion being disposed in electro-magnetic communication with the magnet portion. The bearing element is configured to rotate the rotational member and the magnet portion relative to the sensor portion when the positioning element linearly translates between a first position and a second position.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Embodiments of the present invention relate to a position sensing assembly, such as utilized as part of an actuator assembly. The position sensing assembly includes a bearing element and a helically shaped rotational member used to drive a portion of a sensor assembly, such as a Digital Rotary Magnetic Encoder. Interaction between the bearing element and a helically shaped rotational member minimizes the presence of backlash in the position sensing assembly. Accordingly, as an actuator assembly drives both a control element, such as a flight control surface, and the position sensing assembly, the sensor assembly generates an output signal that accurately reflects the position of the control element. Additionally, when used as part of an actuator assembly for positioning aircraft flight control surfaces, the position sensing assembly provides a relatively low cost alternative to conventional position sensors, such as LVDTs. For example, the Digital Rotary Magnetic Encoder used with the position sensing assembly does not require signal conditioning and signal processing equipment as does an LVDT. Accordingly, installation and operation of the position sensing assembly is relatively less expensive compared to conventional position sensors.

Figure 1:
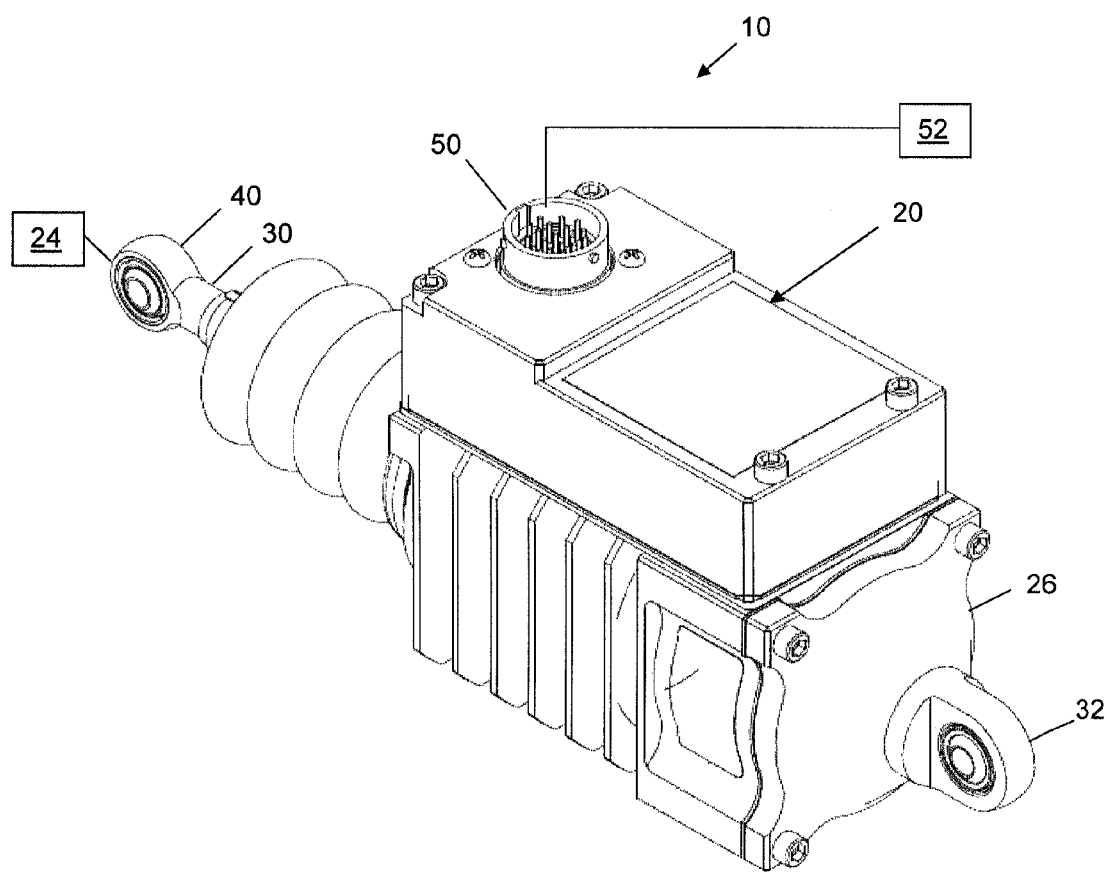
FIG. 1 illustrates a perspective view of an actuator having a position sensing assembly, according to one embodiment of the invention.
Figure 2:
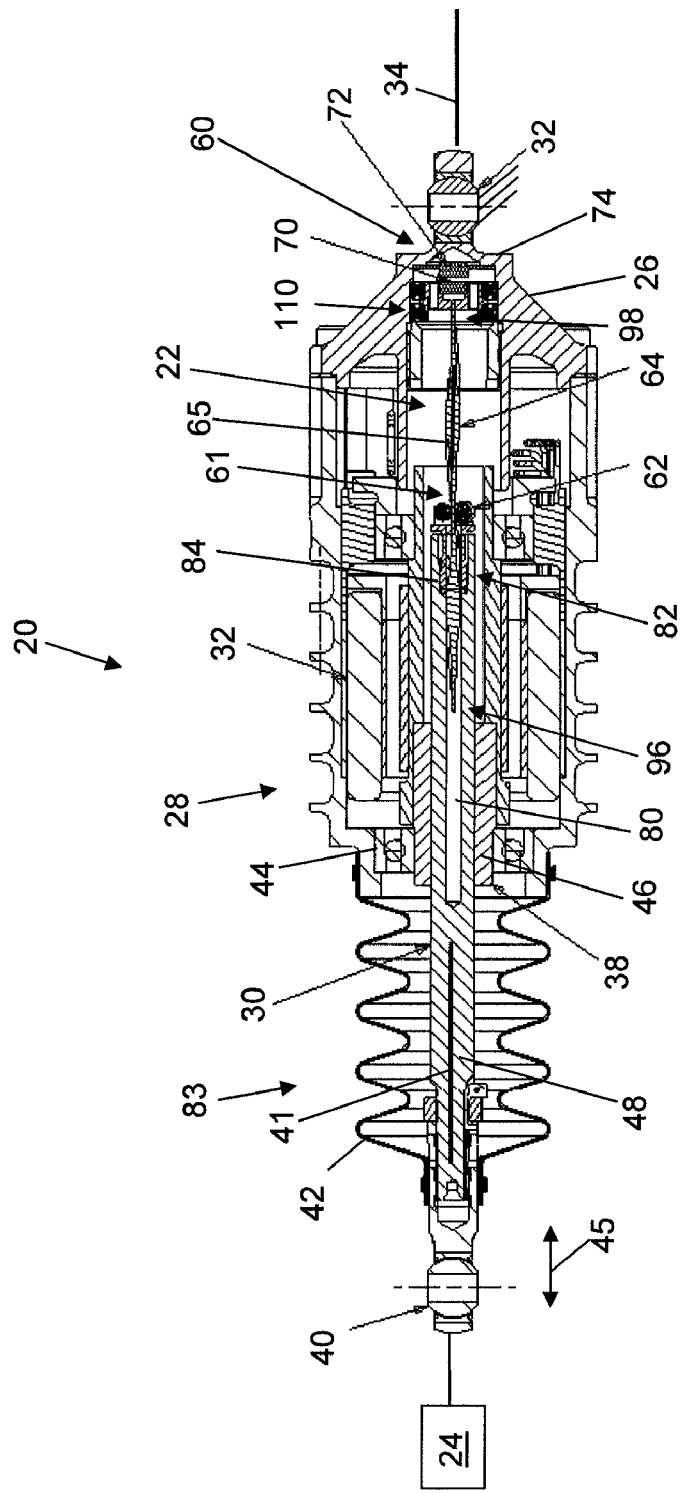
FIG. 2 illustrates a sectional view of the actuator of FIG. 1.

FIGS. 1 and 2 illustrate an example of a flight control assembly 10, such as used with an aircraft, the flight control assembly 10 having an actuator assembly 20 and a position sensing assembly 22. In one arrangement, the actuator assembly 20 includes a housing 26 configured to be secured to a rigid surface, such as an aircraft frame or chassis. For example, the housing 26 includes an attachment portion 30, such as an eyelet extending from the housing 26, which is configured to receive a fastener to secure the housing 26 to the aircraft. The housing 26 also carries an actuator 28 configured to control the positioning of a control element or an aircraft's flight control surface 24, such as an aileron, elevator, or rudder. While the actuator 28 can be configured in a variety of ways, in one arrangement, the actuator 28 includes a positioning element 30 and a motor 32.

The positioning element 30 is configured to be attached to the flight control surface 24. For example, the positioning element 30 includes an attachment portion 40, such as an eyelet extending from the positioning element 30, which is configured to receive a fastener to secure the positioning element 30 to the flight control surface 24. With such attachment, linear movement 45 of the positioning element 30 causes the flight control surface 24 to change its position relative to the aircraft. Additionally, interaction between the attachment portion 40 and the flight control surface 24 also constrains rotation of the positioning element 30 about a longitudinal axis 41 during operation.

In one arrangement, the positioning element 30 includes a protective sheath 42 disposed thereon. The protective sheath 42, such as a bellows, extends between the attachment portion 40 and the housing 26. The protective sheath 42 is configured to allow linear motion of the positioning element 30 relative to a longitudinal axis 34 of the actuator assembly 20 while minimizing the ability for dust or other contaminants to enter the housing 20 and damage components of the actuator assembly 20.

The motor 32, such as a servo motor, is configured to control linear motion of the positioning element 30 relative to the longitudinal axis 34 of the actuator assembly 20. For example, in one arrangement, the motor 32 includes a ball nut 38 supported at least partially by a rotary bearing 44 disposed within the housing 26. The ball nut 38 defines a set of threads 46 that mesh with corresponding threads 48 disposed on the positioning element 30. During operation, in response receiving a command signal, the motor 32 rotates the ball nut 38 relative to the positioning element 30. Based upon the interaction between the threads 46 of the ball nut 38 and the threads 48 of the positioning element 30 and because the flight control surface 24 rotationally constrains the positioning element 30, such rotation causes the positioning element 30 to linearly translate 45 relative to the longitudinal axis 34 of the actuator assembly 20. Linear translation 45 of the positioning element 30 causes the flight control surface 24 to change its position relative to the aircraft.

As indicated above, the actuator assembly 20 includes the position sensing assembly 22. With reference to FIGS. 2 through 8, in one arrangement, the position sensing assembly 22 includes a sensor assembly 60 and a rotation assembly 61 having a bearing element 62 carried by the positioning element 30 and a rotational member 64.

The sensor assembly 60 is configured to generate an output signal indicative of the relative position of the flight control surface 24 and based upon the linear position of the positioning element 30. In one arrangement, as indicated in FIG. 1, the sensor assembly 60 provides the output signal via port 50 to an actuator controller 52.

Figure 4:
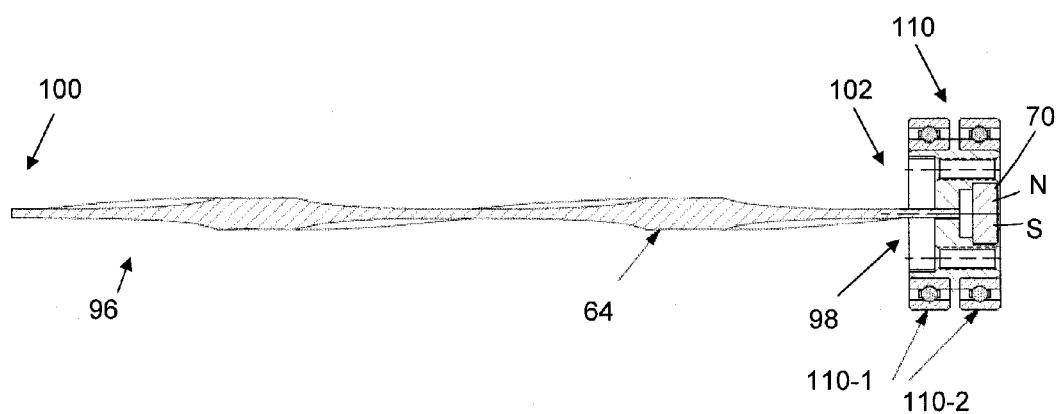
FIG. 4 illustrates a sectional view of the rotational member of FIG. 2.
Figure 5:
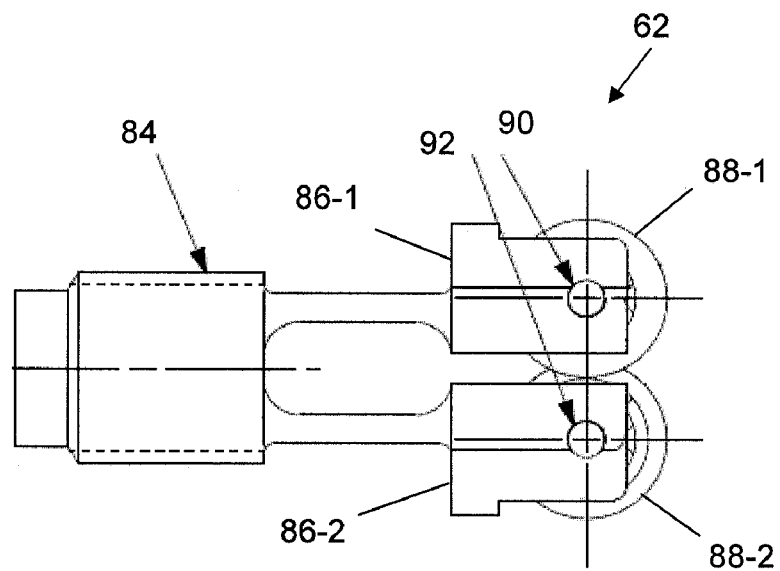
FIG. 5 illustrates a side view of a bearing element of the position sensing assembly of FIG. 2.
Figure 6:
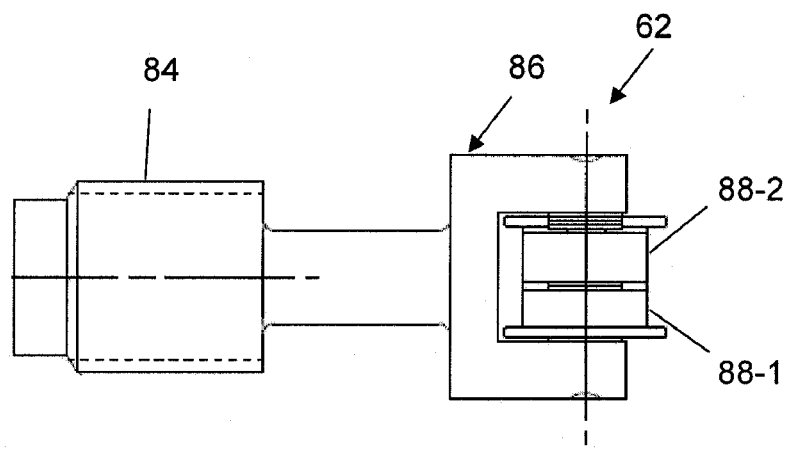
FIG. 6 illustrates a top view of the bearing element of FIG. 2.
Figure 7:
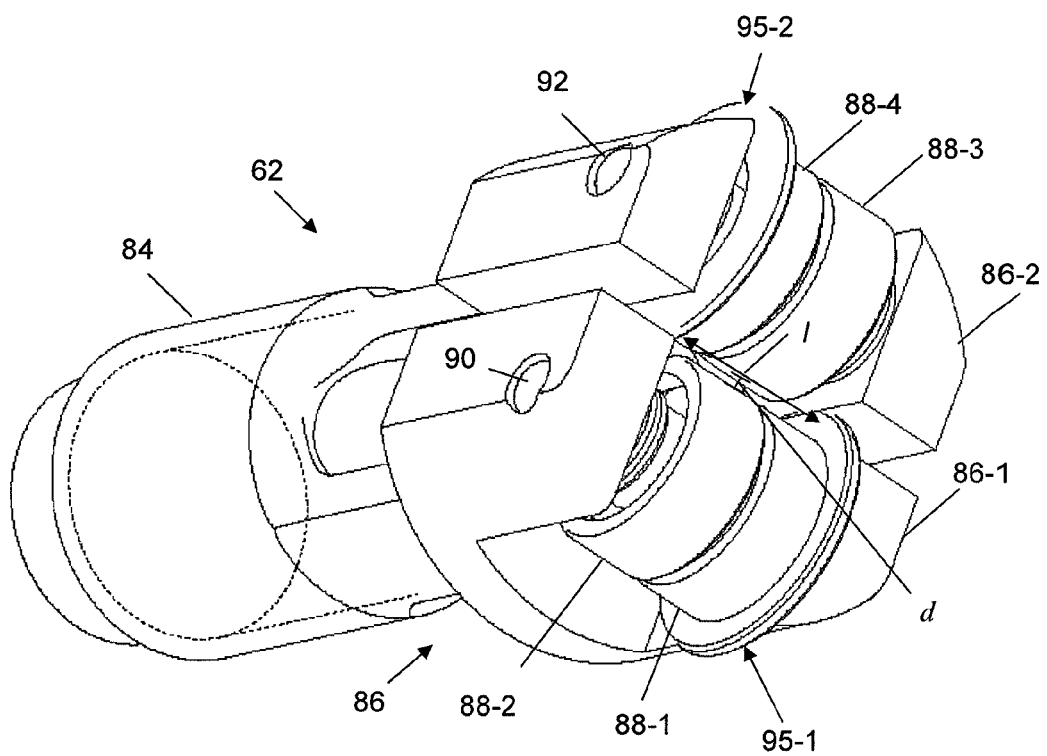
FIG. 7 illustrates a front perspective view of the bearing element of FIG. 2.

With particular reference to FIG. 2 and FIG. 4, the sensor assembly 60 is configured, in one arrangement, as a rotary sensor, such as a Digital Rotary Magnetic Encoder, having a magnet portion 70 carried by the rotational member 64 and a sensor portion 72 carried by the housing 26. The magnet portion 70, for example, is a bipolar magnet having a north pole N and a south pole S. The sensor portion 72 is configured to detect flux or variations in the magnetic field of the magnet portion 70 as the magnet portion 70 rotates relative to the sensor portion 72. For example, in one arrangement, the sensor portion 72 is configured as a set of Hall sensors. While the Hall sensors can have a variety of configurations, in one arrangement the Hall sensors are included as part of an integrated circuit (ICs) mounted on a printed circuit board (PCB) 74. In use, the sensor portion 72, located next to the magnet portion 70, senses the rotation of the magnet portions north N and south S poles and provides the corresponding output signal (1024 or 4096 counts or signals per revolution) to the actuator controller 52. In such a configuration, the output signal provided to the actuator controller 52 by sensor assembly 60 relates to the absolute positioning of the positioning element 30. Accordingly, if the actuator assembly 20 were to lose and regain power, upon resumption of power, the actuator controller 52 can determine the current position of the positioning element 30 based upon output signals received from the sensor assembly 60 after the resumption of power.

As will be described in detail below, bearing element 62 and the rotational member 64 of the rotation assembly 61 are configured to convert the linear motion of the positioning element 30 into a rotary motion of the magnet portion 70. When used in conjunction with the sensor assembly 60, the rotation assembly 61 adapts the rotary sensor assembly 60 to allow the rotary sensor assembly 60 to read linear movement of the positioning element 30 in the actuator assembly 20.

With respect to the bearing element 62, in one arrangement and with particular reference to FIG. 2, the bearing element 62 is carried by the positioning element 30. For example, the positioning element 30 defines a bore or chamber 80 that extends from a second end 82 of the positioning element 30 toward a first or connector end 83 of the positioning element 30. As indicated, a base portion 84 of the bearing element 62 is disposed within the chamber 80. Interaction, such as a friction fit, between the base portion 84 and the chamber 80 secures the bearing element 62 to the positioning element 30.

While the rotational member 64 can be carried by the actuator assembly 20 in a variety of ways, in one arrangement, the rotational member 64 includes a first portion 96 carried by the bearing element 62 and a second portion 98 rotatably coupled to the housing 26. With respect to the first portion of the rotational member 64, and as indicated above, interaction between the bearing element 62 and the rotational member 64 is configured to convert the linear motion of the positioning element 30 into a rotary motion of the magnet portion 70 to cause the rotary sensor assembly 60 to generate a signal. Accordingly, description of arrangements of the rotational member 64 and the bearing element is provided below.

While bearing element 62 can have a variety of configurations, in one arrangement and with particular reference to FIGS. 5-8, the bearing element 62 is configured as a roller bearing element. For example, the bearing element 62 includes a bearing support portion 86 that carries a set of roller bearings 88. While the bearing support portion 86 can be configured with any number of roller bearings 88, in the illustrated example, the bearing support portion 86 includes four roller bearings 88. As illustrated, the bearing support portion 86 includes first and second roller bearings 88-1, 88-2 rotatably mounted via an axle 90 to a first bearing support portion 86-1 and third and fourth bearings 88-3, 88-4 rotatably mounted via an axle 92 an to a second bearing support portion 86-2. Also as shown, the roller bearings 88 define a channel 94 configured to support the rotational member 64, as described in detail below. For example, the first roller bearing includes a first flange 95-1 while the fourth roller bearing 88-4 defines a second flange 95-1 where the first and second flanges 95-1, 95-2 are spaced apart by a distance l. Additionally, the first and second roller bearings 88-1, 88-2 and the third and fourth bearings 88-3, 88-4 are offset by a distance d. In one arrangement, distance d is less than the thickness of the rotational member 64. Taken collectively, distance l between the first and second flanges 95-1, 95-2 and the offset distance d define the channel 94 for support of the rotational member 64.

In one arrangement, the bearing support members 86-1, 86-2 are formed from a spring steel material, such as 17-7PH stainless steel define a second channel 94-2. In such an arrangement, the support members 86-1, 86-2 are configured as cantilevered beams or springs that maintain a substantially constant force, such as about three pounds force, on the rotational element 64 to minimize or eliminate backlash between the support members 86-1, 86-2 and the rotational member 64.

As indicated above, the rotational member 64 includes a first portion 96 carried by the bearing element 62. In one arrangement and with reference to FIGS. 3 and 4, the first portion 96 of the rotational member 64 is configured as a helix or a spiral shape extending between a first end 100 of the rotational member 64 and a second end 102 of the rotational member 64 where the first end 100 opposes the second end 102. While the rotational member 64 can be manufactured from a variety of materials, in one arrangement the rotational member 64 is manufactured from a flat strip of spring steel, twisted about a longitudinal axis 65 of the strip into a spiral shape.

Figure 10A:
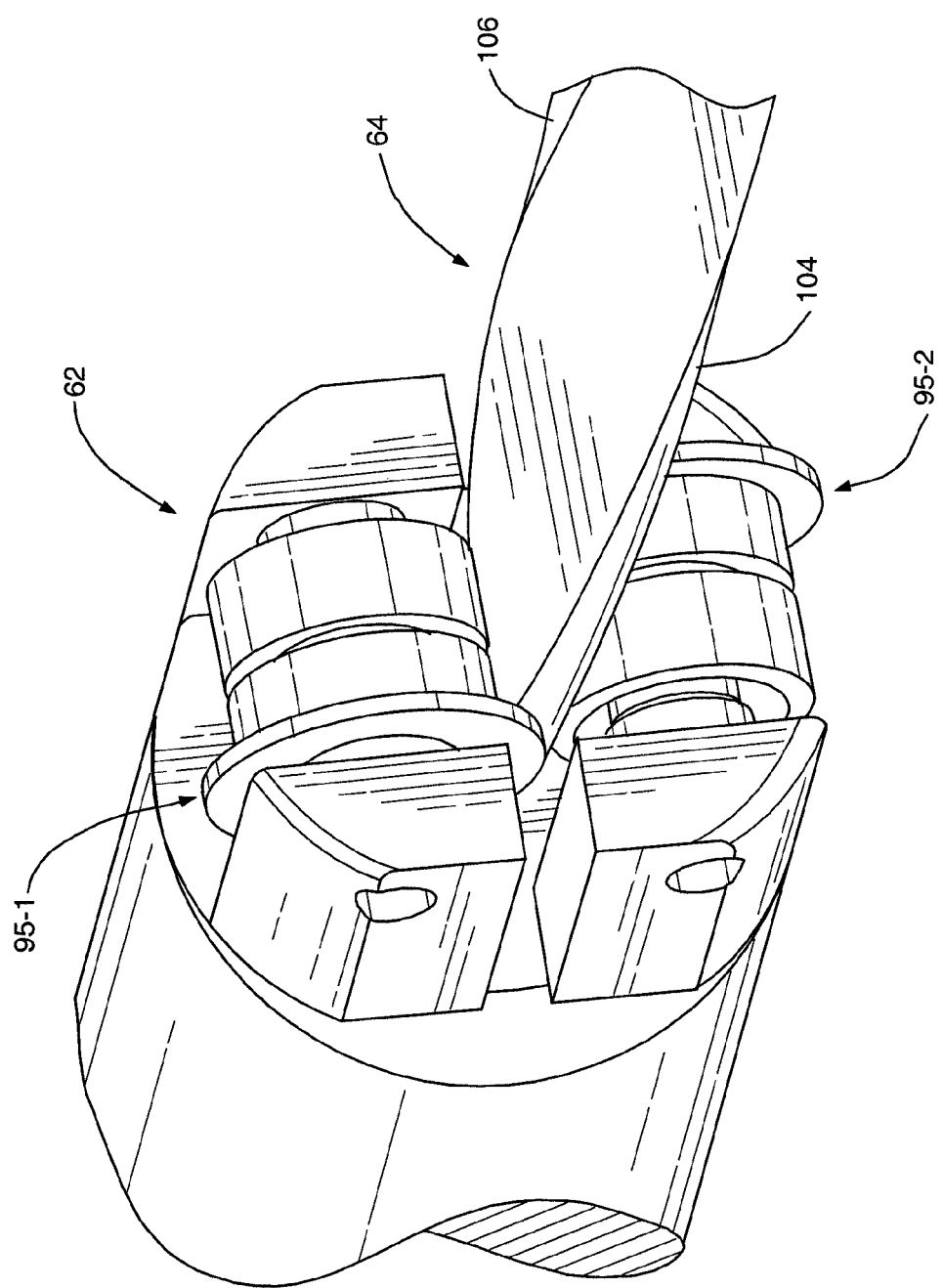
FIG. 10A illustrates a first perspective view of the rotational member carried by the bearing element of FIG. 2.
Figure 10B:
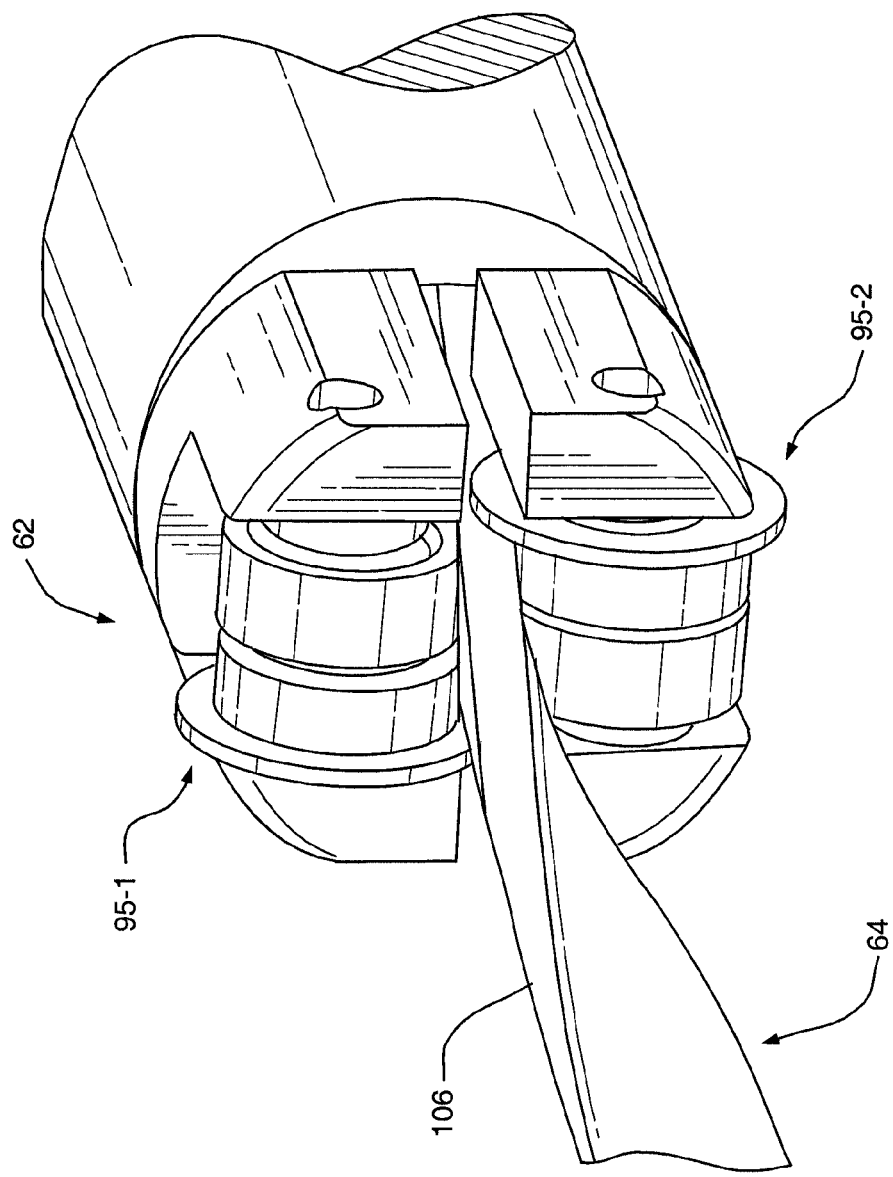
FIG. 10B illustrates a first perspective view of the rotational member carried by the bearing element of FIG. 2.

The rotational member 64 includes a first edge portion 104 extending between the first end 100 and the second end 102 of the rotational member 64 and a second edge portion 106 extending between the first end 100 and the second end 102 of the rotational member 64, the first edge portion 104 opposing the second edge portion 106. As illustrated in FIGS. 10A and 10B, the first and second edge portions 104, 106 are configured to be disposed in proximity to the first and second flanges 95-1 and 95-2 of the bearing element 62. For example, in one arrangement the first edge portion 104 of the rotational member 64 is disposed in proximity to the first flange 95-1 and the second edge portion 106 of the rotational member 64 is disposed in proximity to the second flange 95-2. Interaction between the edge portions 104, 106 of the rotational member 64 and the first and second flanges 95-1 and 95-2 of the bearing element 62 constrains lateral motion of the rotational member 64 during operation.

Returning to FIG. 3, in one arrangement, the length of the edge portions 104, 106 are configured such that, in use, as the bearing element 62 translates 45 within the housing 26 over a stroke length of about three inches, the bearing element 62 causes the rotational member 64 to rotate about the longitudinal axis 65 between 0° and 330° of rotation. In such an arrangement, by constraining the rotation of the rotational member 64 and the magnet portion 70 to less than 360° of rotation, the actuator controller 52 can track the position of the associated flight control surface 24 without requiring additional instrumentation (e.g., a memory) to track multiple revolutions of the magnet portion 70 relative to the sensor portion 72.

Figure 8:
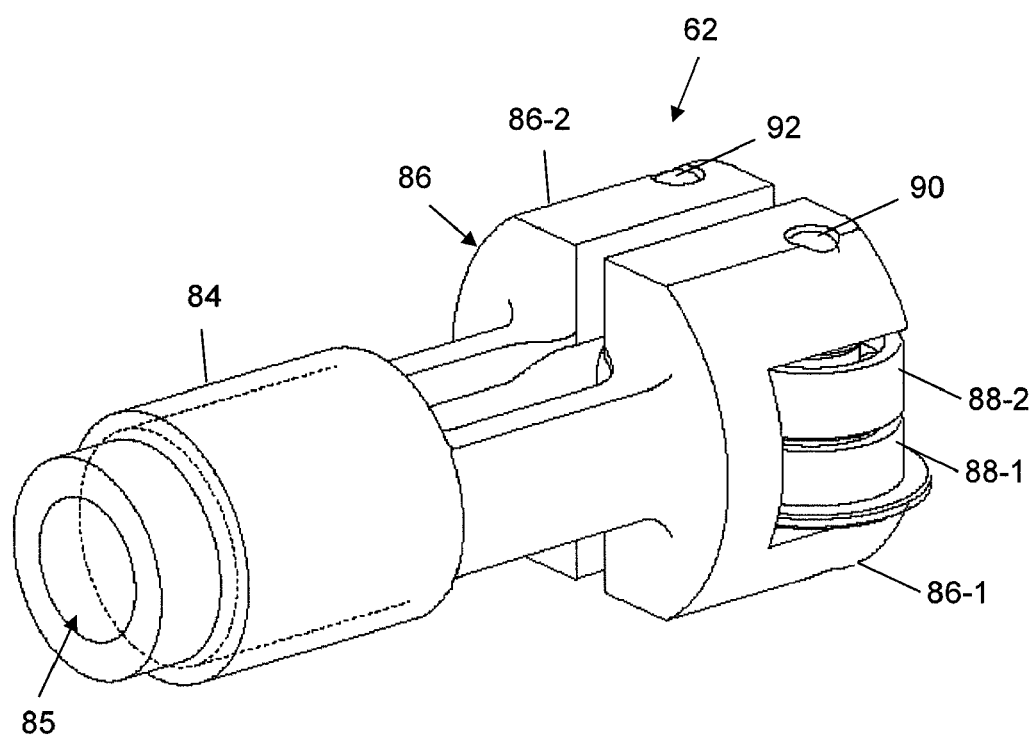
FIG. 8 illustrates a rear perspective view of the bearing element of FIG. 2.

In the aforementioned configuration, in order to reduce the overall size (i.e., length and height) of the actuator assembly 20, in one arrangement the longitudinal axis 65 of the rotational member 64 and a longitudinal axis 41 of the positioning element 30 are substantially collinear. For example, the first portion 96 of the rotational element 64 extends through an opening 85 defined by the bearing element 62, as best illustrated in FIG. 8, and into the chamber 80 defined by the positioning element 30, as illustrated in FIG. 2. With a portion 84 of the rotational member 64 being carried by the bearing element 62 and extending into the positioning element's chamber 80, such an arrangement reduces the overall size of the actuator assembly 20.

Figure 3:
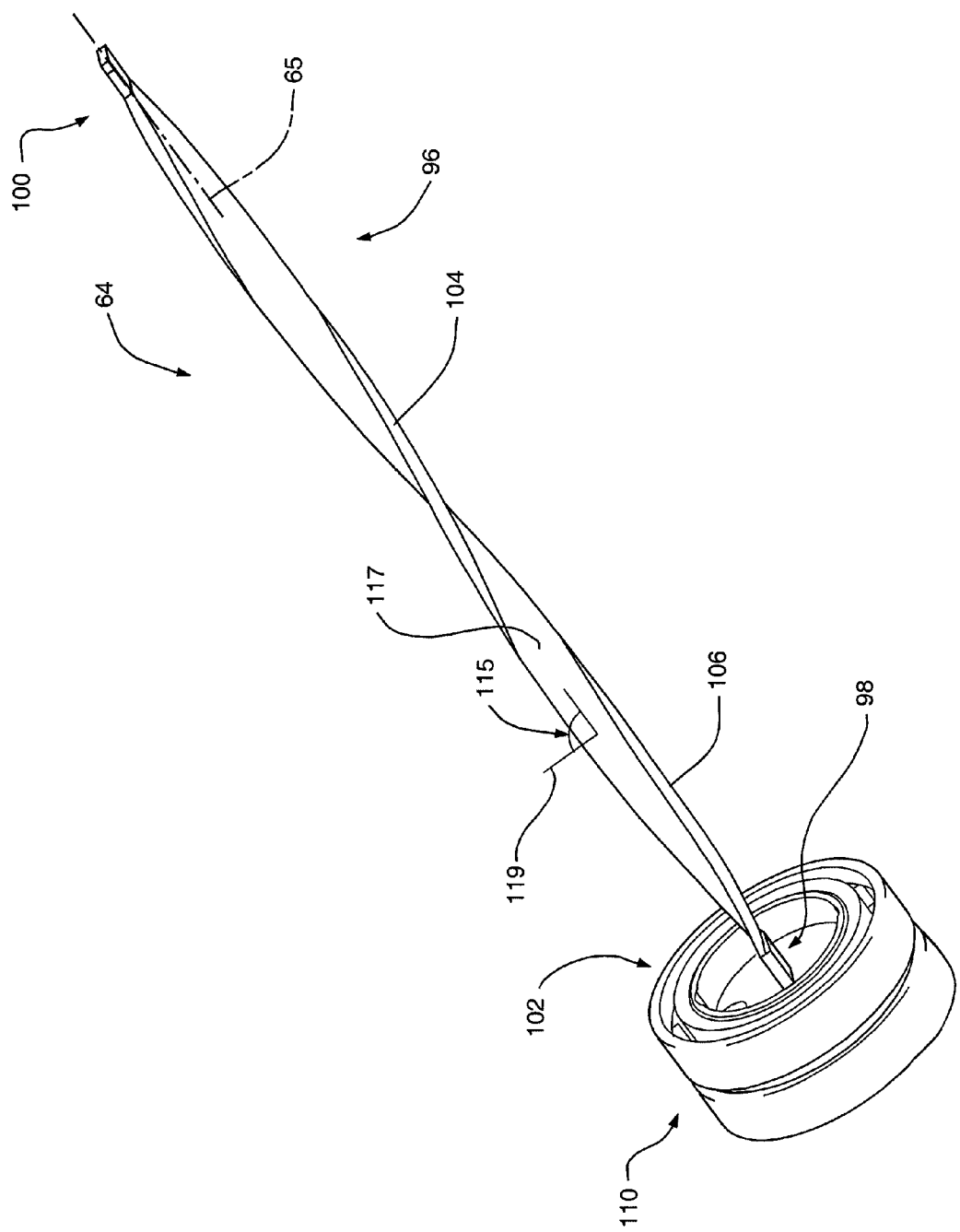
FIG. 3 illustrates a perspective view of a rotational member of the position sensing assembly of FIG. 2.

As indicated above, in one arrangement, the rotational member 64 also includes a second portion 98 rotatably coupled to the housing 26. With reference to FIGS. 2, 3, and 4, the rotational member 64 carries the magnet portion 70 used as part of the sensor assembly 60. For rotary sensors, such as the sensor assembly 60, the stability of the magnet portion 70 is important to the accurate operation of the rotary sensor since exposure of the rotary sensor to external vibrations can cause the rotary sensor to generate erroneous output signals. Accordingly, in one arrangement and with reference to FIGS. 1, 3, and 4, the rotational member 64 includes a bearing 110, such as a rotary bearing, disposed at the second end 102 of the rotational element 64. As shown in FIG. 1, the bearing 110 secures the second portion 98 (i.e., the second end portion 102) of the rotational member 64 to the housing 26. The bearing 110 is configured to constrain both longitudinal motion 45 of the rotational element 64 relative to the housing 26 and lateral and longitudinal movement of the magnet portion 70 to isolate the magnet portion from undesired vibrations. Additionally, the bearing 110 is configured to allow rotational movement of the rotational member 64 and the magnet portion 70 about the longitudinal axis 65 sensor portion 72 carried by the housing 26.

While the bearing 110 can have a variety of configurations, in one arrangement, the bearing 110 includes a first bearing element 110-1 and a second bearing element 110-2. The use of two bearing elements 110-1, 110-2 as part of the rotation assembly 61 aids in minimizing backlash between the rotational element 64 and the housing 26. Accordingly, by minimizing backlash in the rotation assembly 61, the bearing elements 110-1, 110-2 improve the accuracy of the position or output signals generated by the sensor assembly 60 during operation.

In the arrangement described above, during operation, the actuator assembly 20 operates both the flight control surface 24 and the position sensing assembly 22. For example, in response receiving a command signal, the motor 32 rotates the ball nut 38 relative to the positioning element 30. Based upon the interaction between the threads 46 of the ball nut 38 and the threads 48 of the positioning element 30 and because the flight control surface 24 rotationally constrains the positioning element 30, such rotation causes the positioning element 30 to linearly translate 45 relative to the longitudinal axis 34 of the actuator assembly 20. Such translation drives both the flight control surface 24 and the position sensing assembly 22. In particular, as the positioning element 30 translates 45 along the longitudinal axis 34 of the housing 26, the positioning element 30 causes the bearing element to translate relative to the longitudinal axis 65 of the rotational member 64. Such linear translation causes the edge portions 104, 106 to ride relative to the flanges 95-1, 95-2 and rotate the rotational member 64 relative to the longitudinal axis 65 of the rotational member 64. The rotational member 64, in turn, rotates the magnet portion 70 of the sensor assembly 60 relative to the sensor portion 72. In response, the sensor portion 72 generates an output signal indicative of the relative positioning of the flight control surface 24 as caused by the actuator assembly and provides the output signal to the actuator controller 52 for further processing or analysis.

Furthermore, because the distance d is less than the thickness of rotational member 64, when the rotational member 64 is disposed between the first and second roller bearings 88-1, 88-2 and the third and fourth bearings 88-3, 88-4, the rotational member 64 causes the first and bearing support portions 86-1, 86-2 to bend or spring open. With such bending, the first and bearing support portions 86-1, 86-2 operate as cantilevered beam springs that maintain a substantially constant force on the rotational member 64 to minimize or eliminate backlash between the bearing support 86 and the rotational member 64.

In conventional rotary sensor devices, the presence of hysteresis or backlash, such as can occur with the use of gears or other power transmission devices used to drive a portion of the rotary sensor devices, can degrade the accuracy of the rotary sensor output. In the present position sensing assembly 22, interaction of the bearing assembly 62 and the helically-shaped rotational member 64 reduces the presence of backlash within the position sensing assembly 22 while converting the linear motion of the positioning element 30 into a rotary motion of the magnet portion 70. Accordingly, the position sensing assembly 22 provides relatively accurate position sensing of the flight control surface 24. Additionally, the rotary sensor device used with the position sensing assembly 22 does not require signal conditioning and signal processing equipment as does a conventional LVDT. Accordingly, installation and operation of the position sensing assembly 22 is relatively less expensive compared to conventional position sensors.

As indicated above, the interaction of the bearing assembly 62 and the helically-shaped rotational assembly 64 reduces the presence of backlash within the position sensing assembly 22. In one arrangement, the uniformity of the helix-shape of the rotational member 64 is integral to the accuracy of the output signal generated by the sensor assembly 60. In one arrangement, the helix-shape of the rotational member 64 is considered uniform when, with reference to FIG. 3, an angle 115 formed between a surface 117 of the rotational member 64 and a plane 119 perpendicular to the longitudinal axis 65 is substantially constant along the length of the rotational member 64. In certain cases, however, inaccuracies in the helical geometry of the rotational member 64 can affect the accuracy of the output signal generated by the sensor assembly 60 and indicative of the position of the flight control surface 24. For example, assume the helix-shape of the rotational member 64 is not substantially uniform. In such a case, for a given distance of linear translation 45 of the bearing element 62, the rotational member 64 can rotate the magnet portion 70 to a position that causes the sensor assembly 60 to generate an output signal indicative of a positioning of the flight control surface 24 that is either greater or lesser than the actual positioning.

Figure 9:
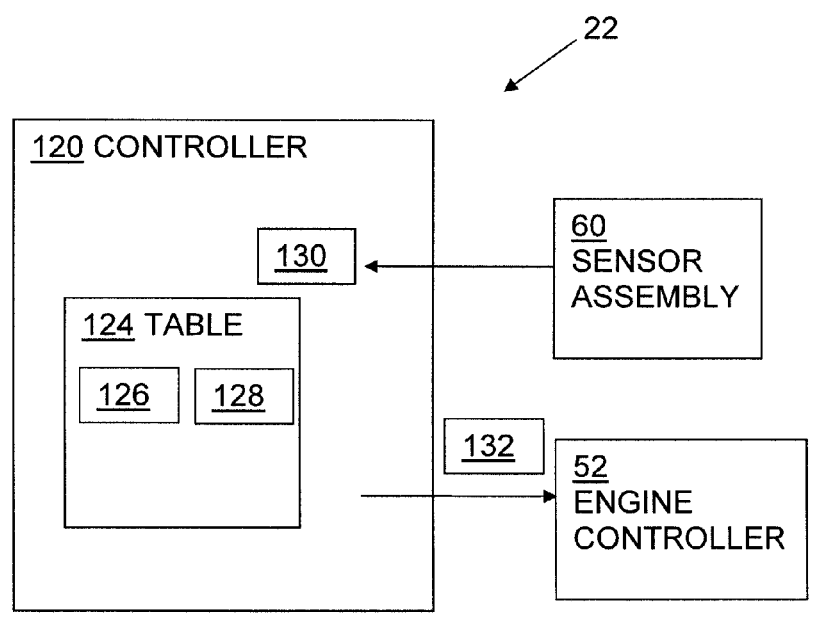
FIG. 9 illustrates a controller used in conjunction with the position sensing assembly of FIG. 1.

In one arrangement, as indicated in FIG. 9, the position sensing assembly 22 includes a controller 120 configured to compensate or correct for inaccuracies in the output signal 130 generated by the sensor assembly 60, such as caused by a non-uniform helical geometry of the rotational member 64. For example, the controller 120, such as a processor, is configured with a position signal table 124 that relates a set of output signals 126 to a set of actual position data elements 128.

Prior to operation, a manufacturer empirically configures the position signal table 124 for a corresponding position sensing assembly 22. For example, in order to characterize the position sensing assembly 22, the manufacturer causes the rotational member 64 to translate by preset amounts, such as 0.010 inch increments, to rotate the magnet portion 70. At each increment, the manufacturer measures the corresponding output signal generated by the sensor assembly 60. The manufacturer then configures the position signal table 124 with the incremental position amounts as the set of actual position data elements 128 and the measured output signals as the corresponding set of output signals 126. In such an arrangement, each output signal provided by the sensor assembly 60 corresponds to an exact position of both the rotational member 24 and a corresponding flight control surface 24, for example, as recorded in the position signal table 124.

During operation of the position sensing assembly 22, as the controller 120 receives an output signal 130 from the sensor assembly; 60, the controller 120 accesses the position signal table 124 to detect a correspondence between the received output signal 130 and entry in the set of output signals 126. After detecting such a correspondence, the controller 120 detects an actual position data element in the set of actual position data elements 128 that corresponds to the entry in the set of output signals 126. The controller 120 in turn, provides, as a reporting signal 132 to the actuator controller 52, the detected actual position data element where the detected actual position data element relates to the actual position of an actuated element, such as a flight control surface 24.

While various embodiments of the invention have been particularly shown and described, it will be understood by those skilled in the art that various changes in form and details may be made therein without departing from the spirit and scope of the invention as defined by the appended claims.

For example, as indicated above, the magnet portion 70 of the sensor assembly 60 is configured as a bipolar magnet having a north pole N and a south pole S. Such description is by way of example only. In one arrangement, the magnet portion 70 is configured as a permanent multi-pole magnet. Alternately, the magnet portion 70 is configured as multiple magnets, each of the multiple magnets configured as a bipolar magnet.

As indicated above, the position sensing assembly 22 operates as part of the actuator assembly 20. Such indication is by way of example only. In one arrangement, the position sensing assembly 22 is configured as a stand-alone device that is configured to attach to an actuated element, such as a flight control surface 24.

As indicated above, in one arrangement, the bearing element 62 is configured to translate 45 within the housing 26 over a stroke length of about three inches and cause the rotational member 64 to rotate about the longitudinal axis 65 between 0° and 330° In such an arrangement, by constraining the rotation of the rotational member 64 and the magnet portion 70 to less than 360° of rotation, the actuator controller 52 can track the position of the associated flight control surface 24 without requiring additional instrumentation (e.g., a memory) to track multiple revolutions of the magnet portion 70 relative to the sensor portion 72. In one arrangement, the bearing element 62 is configured to translate 45 within the housing 26 over a stroke length of greater than three inches, for example ten inches, to cause the rotational member 64 and the magnet portion 70 to rotate over 360° of rotation. In such an arrangement, in order to track the position of the bearing element 62 over such a stroke length, the controller 120 is configured with a memory and a power source, such as a battery, where the memory is configured to store count values associated with the rotation of the magnet portion 70 over 360°.

In one arrangement, as the controller 120 receive an output signal 130 from the sensor assembly 60, based upon the number of counts associated with the output signal, the controller detects a degree of rotation of the magnet portion relative to the sensor assembly 60. For example, assume for rotation of the magnet portion 70 relative to the sensor portion 72, the sensor assembly 60 is configured to generate output signals having values between zero and 1024 counts per 360° revolution. As the controller 120 detects the sensor assembly 60 passing 360°, (e.g., as indicated by a change in the output signal value from 1024 to zero), the controller 120 increments a counter in the memory indicative of the magnet portion 70 passing a full 360° revolution. Accordingly, by tracking the number of 360° revolutions that the magnet portion 70 travels relative to the sensor portion 72, the memory allows the position sensing assembly 22 to operate over relatively large or extended stroke lengths.

What is claimed is:

1. An actuator assembly, comprising:

a positioning element carried by a housing, the positioning element having a first end and a second end opposing the first end, the first end of the positioning element being constructed and arranged to be coupled to a control element;

a rotational member defining a helix extending between a first end of the rotational member and a second end of the rotational member, the first end opposing the second end, the rotational member having a first portion carried by a bearing element disposed at the second end of the positioning element and a second portion rotatably coupled to the housing; and a sensor assembly having a magnet portion disposed at the second end of the rotational member and a sensor portion carried by the housing, the sensor portion disposed in electro-magnetic communication with the magnet portion, the bearing element configured to rotate the rotational member and the magnet portion relative to the sensor portion when the positioning element linearly translates between a first position and a second position.

2. The actuator assembly of claim 1, wherein:

the rotational member comprises a strip of material defining the helix extending between the first end and the second end, the strip of material having a first edge portion extending between the first end and the second end of the rotational member and a second edge portion extending between the first end and the second end of the rotational member, the first edge portion opposing the second edge portion; and the bearing element comprises a first roller bearing element having a first flange and a second roller bearing element having a second flange, the first edge portion of the strip of material being disposed in proximity to the first flange of the first roller bearing the second edge of the strip of material being disposed in proximity to the second flange of the second roller bearing.

3. The actuator assembly of claim 1, wherein a longitudinal axis of the positioning element and a longitudinal axis of the rotational member are substantially collinear.

4. The actuator assembly of claim 3, wherein the positioning element defines a bore extending from the second end of the positioning element toward the first end of the positioning element, at least a portion of the first portion of the rotational element being disposed within the bore.

5. The actuator assembly of claim 1, further comprising a bearing disposed at the second end of the rotational element, the bearing coupling the second portion of the rotational member to the housing, the bearing configured to constrain longitudinal motion of the rotational element relative to the housing and to allow rotational movement of the rotational member relative to the housing.

6. The actuator assembly of claim 1, wherein the positioning element comprises a set of threads disposed on an outer surface of the positioning element and wherein the actuator assembly comprises a motor having a ball nut coupled to the motor, the ball nut carried by the set of threads of the positioning element, the motor configured to rotate the ball nut relative to the positioning element to linearly translate the positioning element between the first position and the second position.

7. The actuator assembly of claim 1, further comprising a controller in electrical communication with the sensor assembly, the controller configured to:
  receive an output signal from the sensor assembly;
  access a position signal table to detect an actual position data element corresponding to the received output signal, the position signal table relating a set of output signals from the sensor assembly to a corresponding set of actual position data elements; and
  provide, as a reporting signal, the actual position data element corresponding to the received output signal.

8. The actuator assembly of claim 1, further comprising a controller having a memory, the controller in electrical communication with the sensor assembly, the controller configured to:
  receive an output signal from the sensor assembly;
  detect a degree of rotation of the magnet portion relative to the sensor assembly based upon the output signal; and
  increment a counter in the memory when the degree of rotation of the magnet portion exceeds 360°.

9. A flight control assembly, comprising:
  a flight control surface; and
  an actuator assembly having:
  a housing,
  a positioning element carried by the housing, the positioning element having a first end and a second end opposing the first end, the first end of the positioning element coupled to the flight control surface,
  a bearing element disposed at the second end of the positioning element, a rotational member defining a helix extending between a first end of the rotational member and a second end of the rotational member, the first end opposing the second end, the rotational member having a first portion carried by the bearing element and a second portion rotatably coupled to the housing, and
  a sensor assembly having a magnet portion disposed at the second end of the rotational member and a sensor portion carried by the housing, the sensor portion disposed in electro-magnetic communication with the magnet portion,
  the bearing element configured to rotate the rotational member and the magnet portion relative to the sensor portion when the positioning element linearly translates between a first position and a second position.

10. The flight control assembly of claim 9, wherein:
  the rotational member comprises a strip of material defining the helix extending between the first end and the second end, the strip of material having a first edge portion extending between the first end and the second end of the rotational member and a second edge portion extending between the first end and the second end of the rotational member, the first edge portion opposing the second edge portion; and
  the bearing element comprises a first roller bearing element having a first flange and a second roller bearing element having a second flange, the first edge portion of the strip of material being disposed in proximity to the first flange of the first roller bearing and the second edge of the strip of material being disposed in proximity to the second flange of the second roller bearing.

11. The flight control assembly of claim 9, wherein a longitudinal axis of the positioning element and a longitudinal axis of the rotational member are substantially collinear.

12. The flight control assembly of claim 11, wherein the positioning element defines a bore extending from the second end of the positioning element toward the first end of the positioning element, at least a portion of the first portion of the rotational element being disposed within the bore.

13. The flight control assembly of claim 9, further comprising a bearing disposed at the second end of the rotational element, the bearing coupling the second portion of the rotational member to the housing, the bearing configured to constrain longitudinal motion of the rotational element relative to the housing and to allow rotational movement of the rotational member relative to the housing.

14. The flight control assembly of claim 9, wherein the positioning element comprises a set of threads disposed on an outer surface of the positioning element and wherein the actuator assembly comprises a motor having a ball nut coupled to the motor, the ball nut carried by the set of threads of the positioning element, the motor configured to rotate the ball nut relative to the positioning element to linearly translate the positioning element between the first position and the second position.

15. The flight control assembly of claim 9, wherein the actuator assembly comprises a controller in electrical communication with the sensor assembly, the controller configured to:
  receive an output signal from the sensor assembly;
  access a position signal table to detect an actual position data element corresponding to the received output signal, the position signal table relating a set of output signals from the sensor assembly to a corresponding set of actual position data elements; and
  provide, as a reporting signal, the actual position data element corresponding to the received output signal.

16. The flight control assembly of claim 9, wherein the actuator assembly comprises a controller having a memory, the controller in electrical communication with the sensor assembly, the controller configured to:
  receive an output signal from the sensor assembly;
  detect a degree of rotation of the magnet portion relative to the sensor assembly based upon the output signal; and
  increment a counter in the memory when the degree of rotation of the magnet portion exceeds 360°.

17. A position sensing assembly, comprising:
  a rotational member defining a helix extending between a first end of the rotational member and a second end of the rotational member, the first end opposing the second end, the rotational member having a first portion carried by a bearing element disposed at the second end of the positioning element and a second portion configured to be rotatably coupled to a housing; and
  a sensor assembly having a magnet portion disposed at the second end of the rotational member and a sensor portion disposed in electro-magnetic communication with the magnet portion;
  the bearing element configured to rotate the rotational member and the magnet portion relative to the sensor portion.

18. The position sensing assembly of claim 17, wherein:
  the rotational member comprises a strip of material defining the helix extending between the first end and the second end, the strip of material having a first edge portion extending between the first end and the second end of the rotational member and a second edge portion extending between the first end and the second end of the rotational member, the first edge portion opposing the second edge portion; and
  the bearing element comprises a first roller bearing element having a first flange and a second roller bearing element having a second flange, the first edge portion of the strip of material being disposed in proximity to the first flange of the first roller bearing and the second edge of the strip of material being disposed in proximity to the second flange of the second roller bearing.

19. The position sensing assembly of claim 17, comprising a bearing disposed at the second end of the rotational element, the bearing configured to couple the second portion of the rotational member to the housing, the bearing configured to constrain longitudinal motion of the rotational element relative to the housing and to allow rotational movement of the rotational member relative to the housing.

20. The position sensing assembly of claim 17, comprising a controller in electrical communication with the sensor portion, the controller configured to:

receive a control element position signal from the sensor portion;

access a position signal table to detect a corrected control element position signal corresponding to the received control element position signal, the position signal table relating a set of control element position signals to a corresponding set of corrected control element position signals; and provide, as an output signal, the corrected control element position signal corresponding to the received control element position signal.

\* \* \* \* \*